Patented Aug. 27, 1929.

1,725,792

UNITED STATES PATENT OFFICE.

MORTIMER T. HARVEY, OF NEW YORK, N. Y., ASSIGNOR, BY DIRECT AND MESNE ASSIGNMENTS, TO THE HARVEL CORPORATION, A CORPORATION OF NEW JERSEY.

CASHEW-NUT-SHELL OIL-REACTION PRODUCT AND METHOD OF PRODUCING THE SAME.

No Drawing. Application filed October 16, 1925. Serial No. 62,935.

The present invention relates to reaction products of the oil from the shell and about the kernel of the cashew nut and to methods of producing them. The invention further relates to coating material, electrical insulating material and material useful in the arts generally.

Cashew nut shell oil I find has an iodine number of about 295 which is extremely high for an oil. Further, this cashew shell oil will remain exposed to the atmosphere without thickening and without substantial decrease in its iodine number. Linseed oil, which has an iodine number of about 175 to 201, is highly unsaturated and thickens through oxidation on exposure to air in a comparatively short time. Even very thin films of the cashew shell oil exposed to air remain undried for indefinite periods of time. The cashew shell oil seems to be of a nature like certain organic cyclic compounds which appear stable in the presence of oxygen under normal conditions and which once an oxidizing reaction has been initiated in some manner go quickly to complete saturation or to complete reaction with any oxygen present in amounts up to saturation.

When cashew shell oil is oxidized its iodine number may be quickly reduced to zero. Further, reaction products of this oil dry very quickly at ordinary and at increased temperatures. The oxidizing agents herein referred to are used in the practice of the present invention as driers for the cashew nut shell oil.

For promoting the oxidation reaction of cashew shell oil I find that acid oxidizers or oxidizers in the presence of acid are valuable. Also the degree to which the reaction takes place can be regulated by controlling the amount of the oxygen and acid contents of the substance or substances put into reaction with the cashew shell oil. Further, the nature of the reaction product can be controlled by regulating the temperature of the reaction, its duration and so on and by choosing different substances for the reaction and various amounts used.

As an example of a reaction with amounts and kinds of materials used and the nature of the reaction product, the following is submitted:

1 part by volume of cashew shell oil.
1 part nitric acid sp. gr. 1.42.
1 part water.

The reaction is strongly exothermic and is complete in a few minutes. The reaction product is a gum from which excess acid may be washed out. The iodine value of the reaction product is zero or very close to zero. The product may be dissolved in vehicles such as amyl acetate, benzine, gasoline, turpentine, alcohol, naphtha, kerosene and others and makes an excellent coating which dries very quickly, and which is useful for paints, varnishes, molded compounds, and so on for material covering purposes, for electrical insulation, for molded ware of all kinds, and for impregnating paper and woven fabrics, etc., for making finishing materials, waterproofing, insulating tapes and the like.

Adhesive coatings such as marine paints and adhesive tapes may be made by making and using a reaction product which is unsaturated with the oxygen or the acid radical or both.

For varying the acid and oxygen actions different materials in different amounts may be used such as nitric acid with hydrochloric acid, or hydrochloric acid with manganese dioxide, or nitric acid with manganese dioxide, or sulphuric acid with one or more of these others, or an acid with potassium dichromate, or any of these with one or more of the others or their equivalents such as may be well known in the art.

Different colored coatings may be made with a suitable solvent and a reaction product of one part by volume of the cashew nut oil and various amounts say from 0.2 to one part of nitric acid sp. gr. 1.42. These colors may be varied from a nearly black through the reds and browns to a light yellow.

Other notable characteristics of these reactions and their products are that the time of drying of the reaction product increases with increase in acid addition, and the volume of the reaction product is about twenty-five per cent or more greater than that of the cashew shell oil used.

While I have indicated various ideas as to the nature of the reactions taking place with the above set forth ingredients it is to be understood that they have been set forth only for the purpose of disclosing the invention and discovery and that more full or accurate statements of the mechanism and theories of the reactions may be discovered without impairing the scope of the invention. For some purposes radicals other than oxygen are used for reducing the iodine number of the said oil such for example as nitrate radical, sulphate radical, sulphur, chlorine, or a number of these or their equivalents.

I claim:

1. The reaction product of cashew nut shell oil with an oxidizing agent and an acid.

2. The method of producing a reaction product from cashew nut shell oil which comprises oxidizing said oil under acid conditions.

3. The method of producing a reaction product of cashew nut shell oil which comprises subjecting it simultaneously to oxidizing and acid conditions.

4. The reaction product of cashew nut shell oil with oxygen radical and acid radical supplying means.

5. The method of treating cashew nut shell oil which comprises mixing therewith nitric acid.

6. The method of treating cashew nut shell oil which comprises mixing therewith nitric acid and washing out excess acid after the action has progressed a predetermined degree.

7. The reaction product of cashew nut shell oil one part by volume and nitric acid specific gravity 1.40 Baumé one part by volume.

8. A composition of matter comprising a reaction product of cashew nut shell oil with nitric acid, and a solvent vehicle for the reaction product.

9. The product of reaction of cashew nut shell oil and nitric acid.

10. A coating material which comprises the product resulting from reacting cashew nut shell oil and nitric acid.

11. The product resulting from the oxidation of cashew nut shell oil under acid conditions.

12. The reaction product of cashew nut shell oil and a drier.

13. In the process of modifying cashew nut shell oil for use, the step which comprises reacting the same with a drier.

In testimony whereof I have hereunto set my hand.

MORTIMER T. HARVEY.